United States Patent
Takahashi

(10) Patent No.: US 7,360,733 B2
(45) Date of Patent: Apr. 22, 2008

(54) MAGNETIC TAPE CARTRIDGE

(75) Inventor: Daisuke Takahashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 10/652,689

(22) Filed: Sep. 2, 2003

(65) Prior Publication Data

US 2004/0104292 A1    Jun. 3, 2004

(30) Foreign Application Priority Data

Sep. 3, 2002    (JP)    ............ P. 2002-257739

(51) Int. Cl.
*G11B 23/107*    (2006.01)
(52) U.S. Cl. ............... 242/338.1; 242/348
(58) Field of Classification Search ......... 242/338.1, 242/338.2, 338.3, 343, 348; 360/85, 92, 360/93, 132
See application file for complete search history.

(56) References Cited

U.S. PATENT DOCUMENTS

| | | | |
|---|---|---|---|
| 3,227,387 A | 1/1966 | Friedrich et al. | |
| 4,106,724 A | 8/1978 | Higashida | |
| 4,214,719 A | 7/1980 | Kato | |
| 4,288,048 A | 9/1981 | Sieben | |
| 4,447,020 A * | 5/1984 | Toi et al. | 242/338.3 |
| 4,559,574 A * | 12/1985 | Umeda | 242/338.3 |
| 4,638,393 A | 1/1987 | Oishi et al. | |
| 4,824,044 A * | 4/1989 | Oogi | 242/338.2 |
| 4,918,558 A * | 4/1990 | Igarashi et al. | 242/338.3 |
| 4,920,436 A * | 4/1990 | Novak | 242/336 |
| 5,031,065 A | 7/1991 | Flor et al. | |
| 5,326,047 A * | 7/1994 | Takahashi et al. | 242/343.2 |
| 5,358,194 A * | 10/1994 | Tompkins | 242/338.3 |
| 5,433,398 A | 7/1995 | Sawada | |
| 6,739,537 B2 | 5/2004 | Mizutani et al. | |

FOREIGN PATENT DOCUMENTS

| | | |
|---|---|---|
| JP | 3-20833 B2 | 3/1991 |
| JP | 04247374 | 9/1992 |
| JP | 5-81747 A | 4/1993 |

* cited by examiner

*Primary Examiner*—Peter M. Cuomo
*Assistant Examiner*—Scott Haugland
(74) *Attorney, Agent, or Firm*—Sughrue Mion, PLLC

(57) ABSTRACT

A magnetic tape cartridge has a case including a datum hole into which a positioning pin is inserted at a predetermined position thereof; a reel rotatably supported on the case with a magnetic tape wound thereon and including an engaging gear formed in the outer periphery of the flange thereof; a rotation restricting mechanism disposed in the case and engaging with the engaging gear of the reel to thereby restrict the rotation of the reel; and, an engagement releasing element slidably inserted into the datum hole from inside the case and removing the engagement between the rotation restricting mechanism and the engaging gear through the sliding movement thereof within the datum hole, wherein the positioning pin is inserted into the datum hole from outside of the case and push and slide the engagement releasing element, thereby releasing the rotation restriction of the reel by the rotation restricting mechanism.

3 Claims, 5 Drawing Sheets

MAGNETIC TAPE CARTRIDGE

BACKGROUND OF THE INVENTION

1. Field of the Invention

The present invention relates to a magnetic tape cartridge and, in particular, to a structure for restricting the rotation of a reel when it is not in use after the reel is stored in a cartridge case with a magnetic tape wound thereon.

2. Description of the Related Art

Conventionally, a magnetic tape cartridge, which is used for a video tape or for a magnetic tape for use in an external recording apparatus for a computer, comprises a reel stored in a cartridge case for winding a magnetic tape thereon; and also, the magnetic tape cartridge further includes a rotation restricting mechanism which is used to restrict the rotation of the reel when it is not in use in order to prevent the wrong loading and damage of the magnetic tape due to loosening of the magnetic tape (for example, Page 3 and FIG. 1 of JP-B-3-20833).

And, when the magnetic tape cartridge is mounted into a recording and reproducing apparatus, in case where a rotation restriction removing pin provided on the recording and reproducing apparatus side is inserted into an insertion hole formed so as to communicate with the interior and exterior of the cartridge case, the rotation restriction of the reel by the rotation restricting mechanism can be removed by the rotation restriction removing pin.

Also, in the magnetic tape cartridge of this type, there is formed a positioning hole: that is, when mounting the magnetic tape cartridge into the recording and reproducing apparatus, the positioning pin disposed on the recording and reproducing apparatus side is inserted into the positioning hole to thereby position the magnetic tape cartridge at a predetermined position of the recording and reproducing apparatus (for example, Page 3, FIGS. 2 and 3 of JP-A-5-81747).

However, in the above-cited magnetic tape cartridges, the recording and reproducing apparatus, into which the magnetic tape cartridge is to be mounted, must include not only a pin for removing the rotation restricting mechanism for restricting the rotation of the reel but also a positioning pin for positioning the magnetic tape cartridge at a proper position, which complicates the structure of the magnetic tape cartridge as well as the structure of the recording and reproducing apparatus for mounting the magnetic tape cartridge thereinto. Also, since the interior and exterior of the cartridge case are made to communicate with each other through the insertion hole into which the rotation restriction removing pin is inserted, dust is easy to invade the cartridge case through the insertion hole, which results in the poor dustproof performance of the magnetic tape cartridge.

SUMMARY OF THE INVENTION

The present invention aims at eliminating the drawbacks found in the above-mentioned conventional magnetic tape cartridges. Accordingly, it is an object of the present invention to provide a magnetic tape cartridge which not only can simplify the recording and reproducing apparatus but also can provide excellent dustproof performance.

In attaining the above object, according to the present invention as set forth in a first aspect, there is provided A magnetic tape cartridge having a case including a datum hole into which a positioning pin is inserted at a predetermined position thereof; a reel rotatably supported on the case with a magnetic tape wound thereon and including an engaging gear formed in the outer periphery of the flange thereof; a rotation restricting mechanism disposed in the case and engaging with the engaging gear of the reel to thereby restrict the rotation of the reel; and, an engagement releasing element slidably inserted into the datum hole from inside the case and removing the engagement between the rotation restricting mechanism and the engaging gear through the sliding movement thereof within the datum hole, wherein the positioning pin is inserted into the datum hole from outside of the case and push and slide the engagement releasing element, thereby releasing the rotation restriction of the reel by the rotation restricting mechanism.

According to the present magnetic tape cartridge, since insertion of the pin into the datum hole can carry out the positioning of the magnetic tape cartridge at a predetermined position and the removal of the rotation restriction of the reel by the rotation restricting mechanism at the same time, there is eliminated the need for separate provision of pins respectively used to position the magnetic tape cartridge and remove the rotation restriction of the reel, thereby being able to simplify the structure of the magnetic tape cartridge and the structure of a recording and reproducing apparatus into which the magnetic tape cartridge is to be mounted. Especially, because the datum hole capable of both positioning of the magnetic tape cartridge and removal of the rotation restriction is closed on the inside of the case by the engagement releasing element slidably inserted into the datum hole to thereby secure the excellent dustproof performance, which makes it possible to positively prevent dust from invading the interior of the case and also to prevent the magnetic tape against damage.

Here, the above-mentioned rotation restricting mechanism may also be structured in the following manner. According to a second aspect of the present invention, there is provided that a magnetic tape cartridge as set forth in the first aspect, the rotation restricting mechanism further having: an engaging element including a shaft part disposed upright on the bottom surface of the case and rotatably supported on the case, a reel lock piece extended from the shaft part toward the outer peripheral direction thereof and having a leading end engageable with the engaging gear, and an inclined piece extended from the shaft part in the outer peripheral direction thereof and having an inclined surface inclined with respect to the axial direction thereof, the shaft part, the reel lock piece and inclined piece being formed as an integral body; an engagement releasing element having a leading end portion contacted with the inclined piece of the engaging element and a base end portion inserted into the datum hole; and, an elastic member for energizing the engagement releasing element in a direction to push the engagement releasing element into the datum hole, wherein the positioning pin is inserted into the datum hole to thereby project the engagement releasing element from the datum hole, and the leading end portion of the engagement releasing element is pressed against the inclined piece of the engaging element to thereby rotate the engaging element by a predetermined angle, whereby the reel lock piece engaged with the engaging gear is removed from the engaging gear.

Further, According to a third aspect of the present invention, there is provided that a magnetic tape cartridge as set forth in the first or second aspect, wherein a spiral-shaped groove is formed in the inner peripheral surface of the datum hole, a spiral-shaped projecting strip is formed in the outer peripheral surface of the engagement releasing element so as to slidably engage with the spiral-shaped groove, and, as the pin is moved in the insertion direction thereof, the engagement releasing element is rotated by the spiral-shaped groove and projecting strip, thereby releasing the rotation restriction of the reel by the reel lock piece.

In addition, according to a fourth aspect of the present invention, there is provided that the spiral-shaped projecting strip may also be formed in a portion of the outer peripheral surface of the engagement releasing element so as to extend in the peripheral direction thereof, or, instead of the projecting strip, projections may be disposed spirally and discretely. Also, a plurality of datum holes can also be formed.

DETAILED DESCRIPTION OF THE PREFERRED EMBODIMENTS

Now, description will be given below in detail of the preferred embodiments of a magnetic tape cartridge according to the present invention with reference to the accompanying drawings.

By the way, in the present specification, description will be given of an example in which, as a magnetic tape cartridge, there is used a magnetic tape cartridge for a magnetic tape for use in a recording and reproducing apparatus serving as an external recording unit for a computer.

Figure 1:
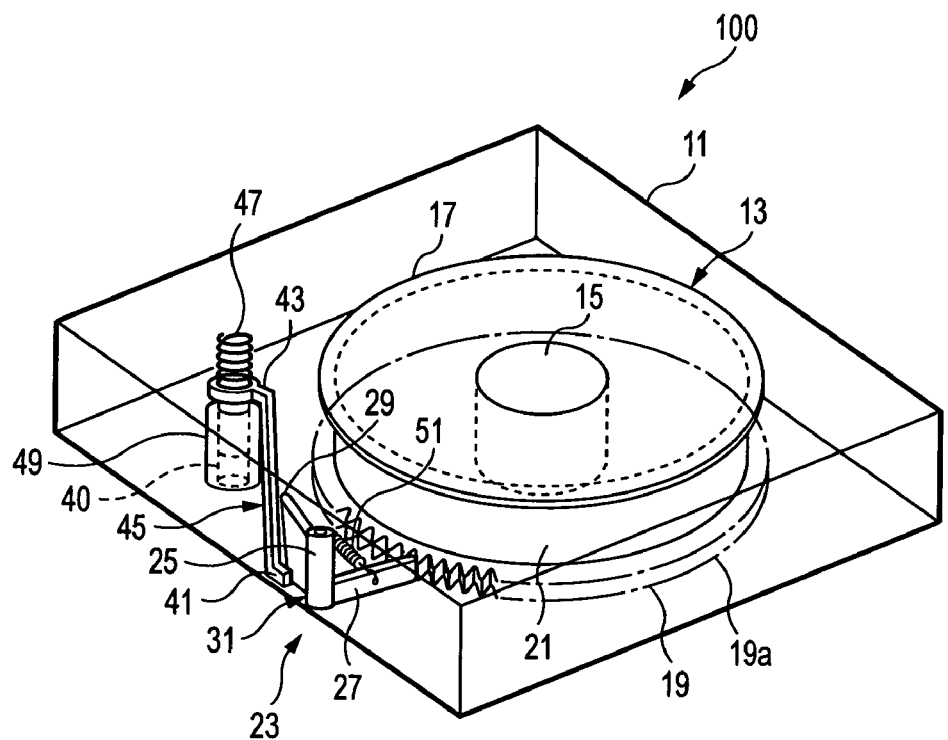
FIG. 1 is a schematic perspective view of the structure of a magnetic tape cartridge according to a first embodiment of the present invention.
Figure 2:
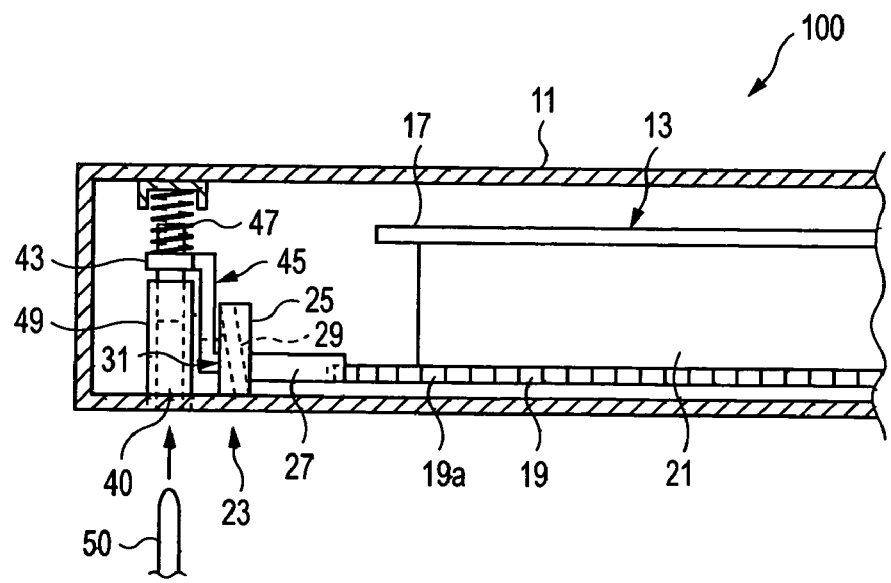
FIG. 2 is a schematic section view of the structure of the magnetic tape cartridge.
Figure 3:
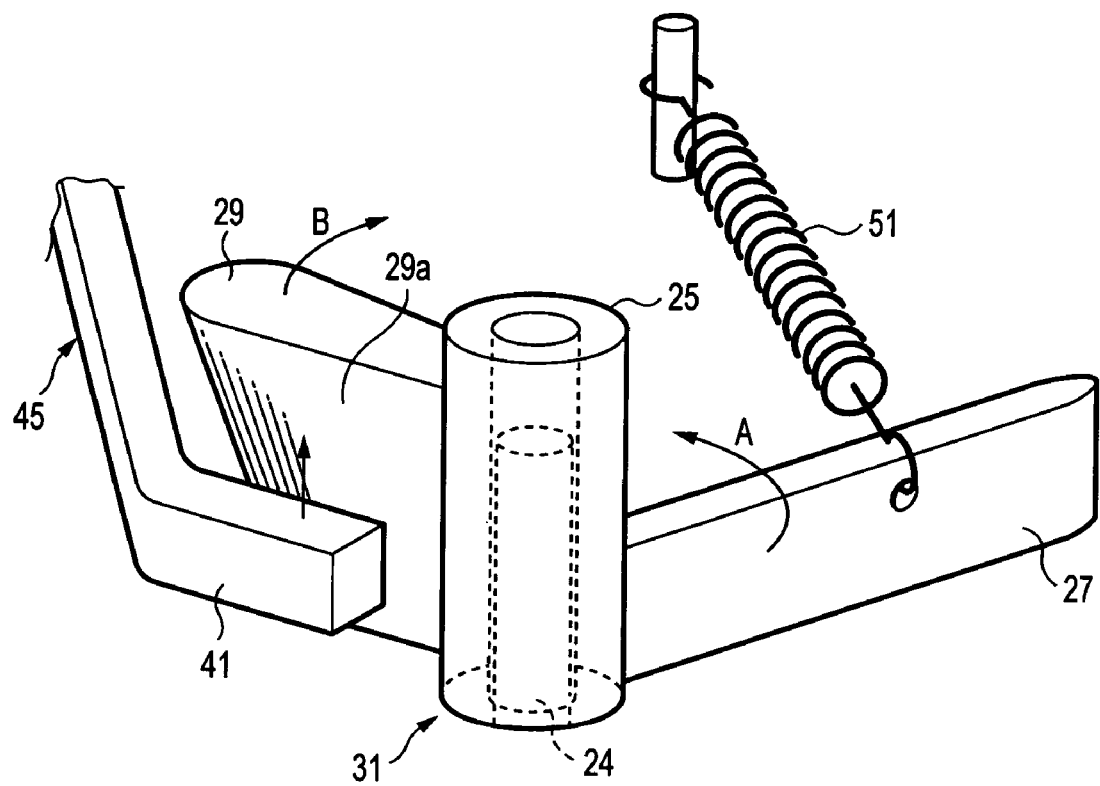
FIG. 3 is an enlarged view of the main portions of a rotation restricting mechanism used in the first embodiment.

Now, FIG. 1 is a schematic perspective view of the structure of a magnetic tape cartridge according to a first embodiment of the present invention, FIG. 2 is a schematic section view of the structure of the magnetic tape cartridge, FIG. 3 is an enlarged view of the main portions of a rotation restricting mechanism employed in the first embodiment, and FIG. 4 is an explanatory view to show how to remove the restriction of the rotation restricting mechanism.

As shown in FIGS. 1 and 2, a magnetic tape cartridge 100 according to the present embodiment includes a reel 13 which is stored in the interior of a case 11 in such a manner that it can be rotated on a pivot.

The reel 13 includes a reel hub 15 disposed in the central portion thereof as well as upper and lower flanges 17, 19 which are respectively disposed on the upper and lower portions of the reel hub 15. Also, on the outer periphery of the lower flange 19, there is formed an engaging gear 19a so as to extend in the peripheral direction thereof. And, on the reel 13, there is wound a magnetic tape 21 between the upper and lower flanges 17 and 19 from the reel hub 15.

In the interior of the case 11 in which the reel 13 is rotatably supported on a pivot, on the outer peripheral side of the reel 13, there is disposed a rotation restricting mechanism 23. The rotation restricting mechanism 23, as shown in FIG. 3 as well, includes a rotation restricting element 31 formed integrally with a cylindrical-shaped shaft part 25 the inner peripheral surface of which is fitted over the outer surface of a support shaft 24 provided on and stood upright from the bottom surface of the case 11 and also which is rotatably supported, a reel lock piece 27 extended from the shaft part 25 in the outer peripheral direction of the shaft part 25 and having a leading end portion engageable with the engaging gear 19a of the lower flange 19, and an inclined piece 29 extended from the shaft part 25 in the outer peripheral direction of the shaft part 25 and having an inclined surface 29a inclined with respect to the axial direction of the shaft part 25, an engagement releasing element 45 the leading end portion 41 of which can be contacted with the inclined surface 29a of the inclined piece 29 and the base end portion 43 of which can be inserted into a datum hole 40 from inside the case 11, and a compression spring 47 for energizing the engagement releasing element 45 in a direction where the engagement releasing element 45 can be pressed into the datum hole 40. By the way, the compression spring 47 is fixed to the upper surface side of the case 11 and is pressed against the engagement releasing element 45.

Also, on the reel lock piece 27 of the rotation restricting element 31, there is mounted a tension spring 51 which normally energizes the reel lock piece 27 in the A direction in FIG. 3 so that the leading end of the reel lock piece 27 can be engaged with the engaging gear 19a of the lower flange 19.

The datum hole 40 is in communication with the inner peripheral surface of a cylindrical rib 49 provided on the inner bottom surface of the case 11 so as to be stood upright on the inner side of the case 11; and, the datum hole 40 is used to position the magnetic tape cartridge 100. That is, when mounting the magnetic tape cartridge 100 into a recording and reproducing apparatus, a restriction removing/positioning pin (pin) 50 disposed on the recording and reproducing apparatus side is inserted into the datum hole 40 from outside the case 11 to thereby position the magnetic tape cartridge 100 at a predetermined position within the recording and reproducing apparatus. Also, the datum hole 40, as will be discussed later, can also be used to remove the rotation restriction of the reel 13.

Figure 4A:
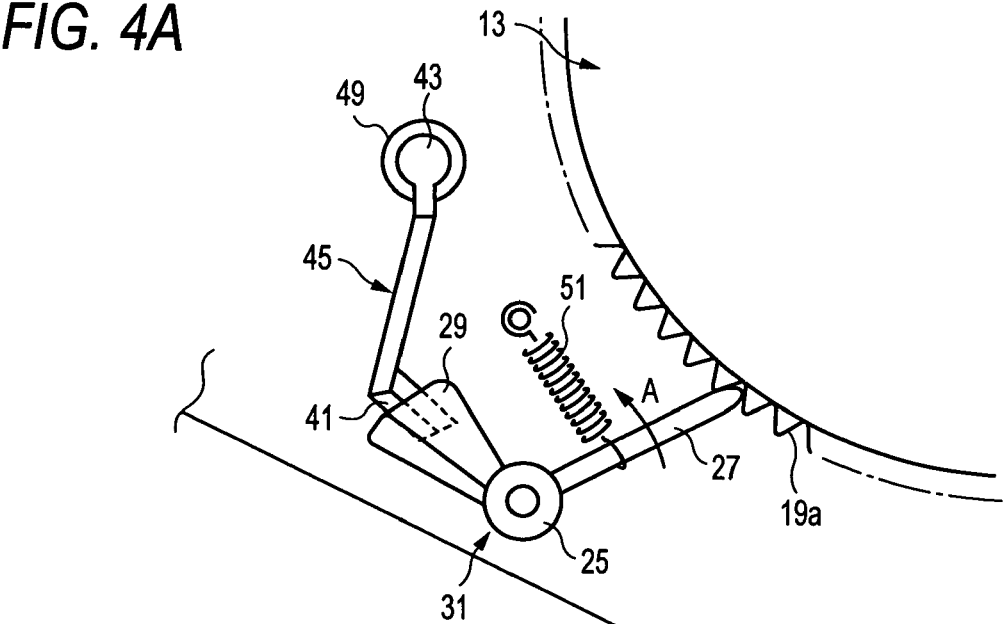
FIGS. 4A and 4B are explanatory views to show how to remove the rotation restriction of a reel by the rotation restricting mechanism.
Figure 4B:
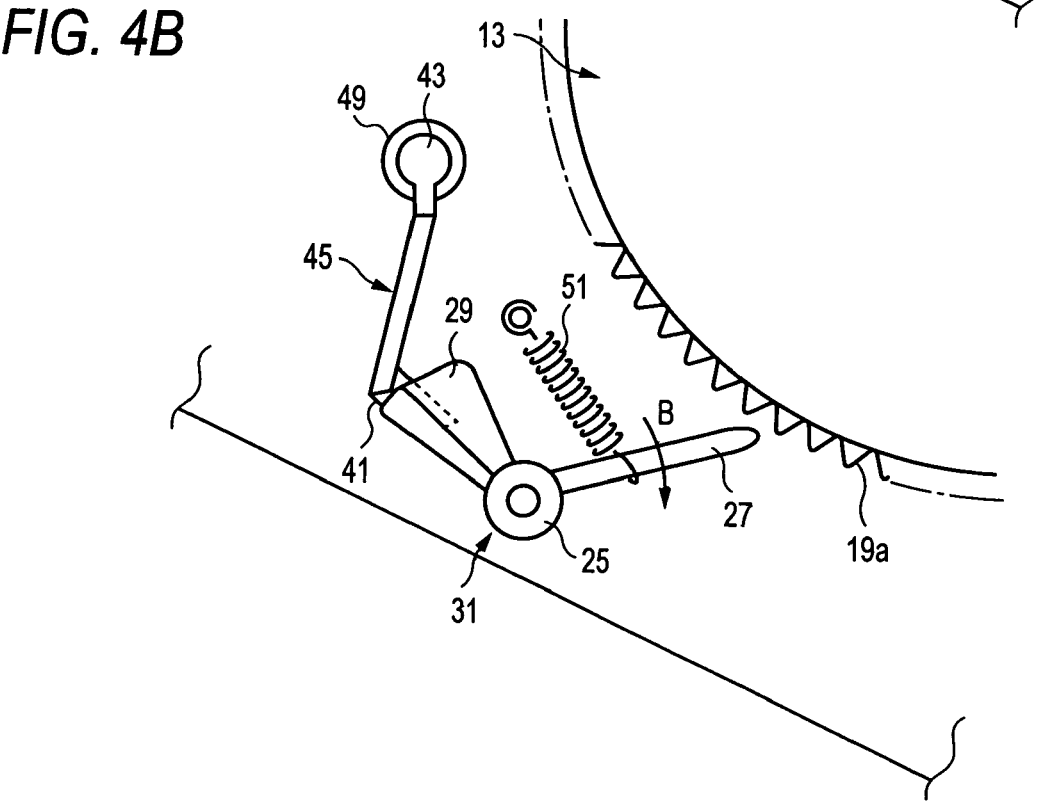

According to the structure of the magnetic tape cartridge 100, by inserting the restriction removing/positioning pin 50 into the datum hole 40 (see FIG. 2), the base end portion 43 of the engagement releasing element 45 energized in the insertion direction by the compression spring 47 is raised up against the energizing force of the compression spring 47 and is projected from the upper surface of the cylindrical rib 49. Due to this, the leading end portion 41 of the engagement releasing element is also raised up (see FIG. 3) and is slided on the inclined piece 29 of the rotation restricting member 31 along the inclined surface 29a of the inclined piece 29 to thereby press the inclined piece 29 in the rotation direction B in which the inclined piece 29 can be rotated about the shaft part 25. As a result of this, as shown in FIG. 4, the rotation restricting element 31 is rotated by a predetermined angle in the B direction from the state thereof shown in FIG. 4A to the state thereof shown in FIG. 4B against the A-direction pulling force of the tension spring 51. Due to this rotational operation, the reel lock piece 27 of the rotation restricting element 31 is separated from the engaging gear 19a to thereby remove the engagement between the reel lock piece 27 and engaging gear 19a.

And, when taking the magnetic tape cartridge 100 out of the recording and reproducing apparatus, in case where the restriction removing/positioning pin 50 is pulled out of the datum hole 40, the reel lock piece 27 of the rotation restricting element 31 is engaged again with the engaging gear 19a of the reel 13 by the tension spring 51 to thereby restrict the rotation of the reel 13.

As described above, according to the magnetic tape cartridge 100, since insertion of the restriction removing/positioning pin 50 into the datum hole 40 not only can position the magnetic tape cartridge 100 at a predetermined position but also can remove the rotation restriction of the reel 13 by the rotation restricting mechanism 23 at the same time, there is eliminated the need for separate provision of two pins respectively for positioning the magnetic tape cartridge and for removing the rotation restriction of the reel 13, thereby being able to simplify the structure of the magnetic tape cartridge 100 and the structure of the recording and reproducing apparatus.

Especially, since the datum hole 40, which can be used not only to remove the rotation restriction of the reel 13 but also to position the magnetic tape cartridge, can be closed from inside the case 11 by the slidably inserted engagement releasing element 45, there can be secured excellent dust-proof performance, thereby being able to positively prevent dust from getting into the interior of the case 11.

Next, description will be given below of a second embodiment of a magnetic tape cartridge according to the present invention.

A magnetic tape cartridge according to the present embodiment is different only in the rotation restricting mechanism from the magnetic tape cartridge according to the first embodiment and the remaining portions of the second embodiment are similar to those of the first embodiment. Thus, duplicate description of the same parts is omitted here.

Figure 5:
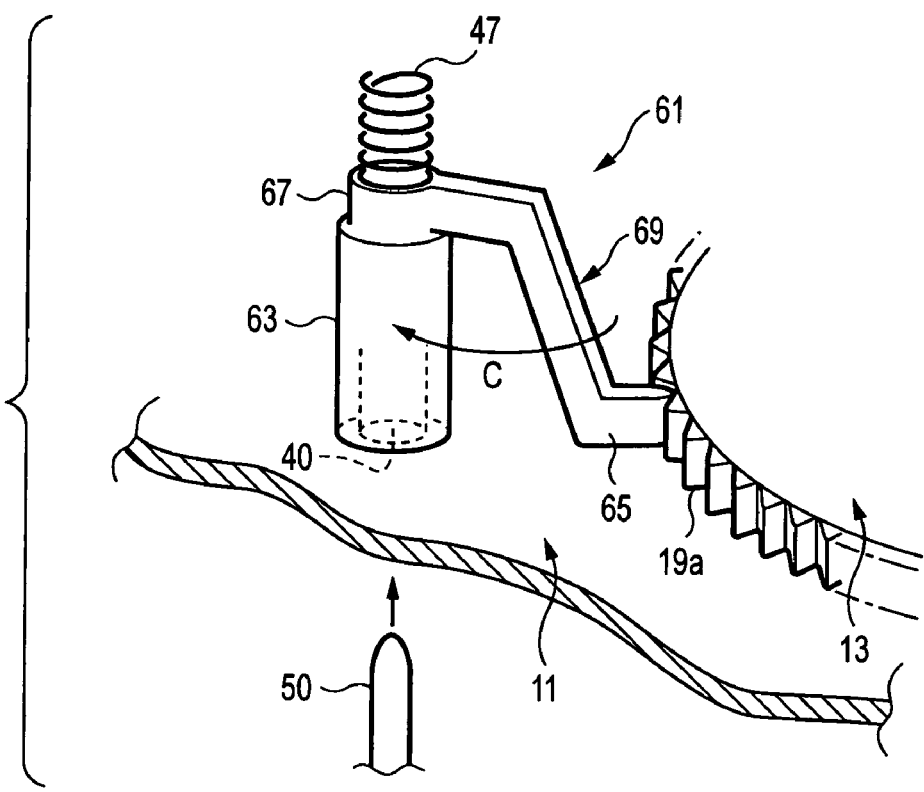
FIG. 5 is a schematic view of the main portions of a rotation restricting mechanism used in a second embodiment of a magnetic tape cartridge according to the present invention.
Figure 6:
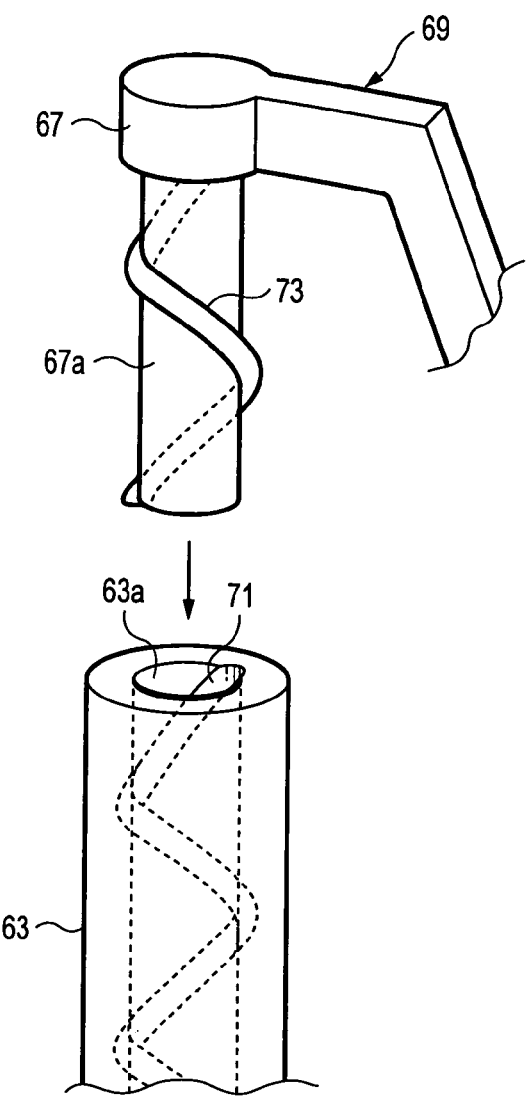
FIG. 6 is an enlarged view of the detailed structure of the rotation restricting element shown in FIG. 5; and, FIGS. 7A and 7B are perspective views of modifications of a spiral-shaped projecting strip to be disposed on the rotation restricting element.

Here, FIG. 5 is a schematic view of the main portions of the rotation restricting mechanism of the magnetic tape cartridge according to the present embodiment, and FIG. 6 is an enlarged view of the detailed structure of a rotation restricting element used in the present embodiment.

This rotation restricting mechanism 61, as shown in FIG. 5, includes a cylindrical rib 63 which is disposed on the bottom surface of a case 11 and in which a datum hole 40 is formed, and a rotation restricting element 69 having a leading end portion 65 to be engaged with the engaging gear 19a of a lower flange 19 and a base end portion 67 to be inserted into the inner peripheral surface of the cylindrical rib 63. By the way, the base end portion 67 of the rotation restricting element 61 is energized in the insertion direction thereof into the cylindrical rib 63 by a compression spring 47.

Here, the rotation restricting element 69 and cylindrical rib 63, as shown in FIG. 6, are structured such that, while their respective spiral-shaped projecting strip and groove are threadedly engaged with each other, they are fitted and engaged with each other. That is, in the inner peripheral surface 63a, there is formed a spiral-shaped groove 71 and, in the insertion portion 67a of the base end portion 67 of the rotation restricting element 69 that is to be inserted into the cylindrical rib 63, there is formed a spiral-shaped projecting strip 73 which can be slidably engaged with the spiral-shaped groove 71.

Thanks to this structure, after the base end portion 67 of the rotation restricting element 69 is once inserted into the cylindrical rib 63 and is energized in the insertion direction by the compression spring 47, in case where a restriction removing/positioning pin 50 shown in FIG. 5 is inserted into the datum hole 40, the base end portion 67 is raised up while rotating in the C direction in FIG. 5. Also, in case where the restriction removing/positioning pin 50 is removed from the datum hole 40, the base end portion 67 is lowered down by the energizing force of the compression spring 47 while rotating in the opposite direction to the C direction, so that the base end portion 67 is returned to its original position where it can be engaged with the engaging gear 19a.

In other words, before the magnetic tape cartridge is mounted into the recording and reproducing apparatus, the base end portion 67 of the rotation restricting element 69 is energized in its insertion direction into the datum hole 40 by the compression spring 47, while the leading end portion 65 of the rotation restricting element 69 is engaged with the engaging gear 19a to thereby restrict the rotation of the reel 13.

And, in case where the magnetic tape cartridge is mounted into the recording and reproducing apparatus, the restriction removing/positioning pin 50 is inserted into the datum hole 40 to thereby position the magnetic tape cartridge at a predetermined position in the interior of the recording and reproducing apparatus. And, at the same time, the rotation restricting element 69 is moved upwardly against the energizing force of the compression spring 47, so that the rotation restricting element 69 is rotated in the arrow mark C direction to thereby remove the engaged state of the leading end portion of the rotation restricting element 69 with the engaging gear 19a.

Therefore, in the case of the above-structured rotation restricting mechanism 61 as well, since insertion of the restriction removing/positioning pin 50 into the datum hole 40 can position the magnetic tape cartridge at a predetermined position and can remove the rotation restriction of the reel 13 by the rotation restricting element 69 at the same time, there is eliminated the need for separate provision of pins which are respectively used to position the magnetic tape cartridge and remove the rotation restriction of the reel 13, thereby being able to simplify the structure of the magnetic tape cartridge and the structure of the recording and reproducing apparatus. Also, in this case as well, because the datum hole 40 is closed from inside the case 11 by the rotation restricting element 69 inserted into the cylindrical rib 63, there can be secured excellent dustproof performance and thus invasion of dust into the case 11 can be prevented positively.

Figure 7A:
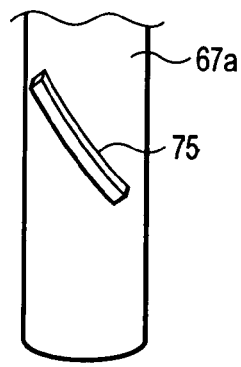
Figure 7B:
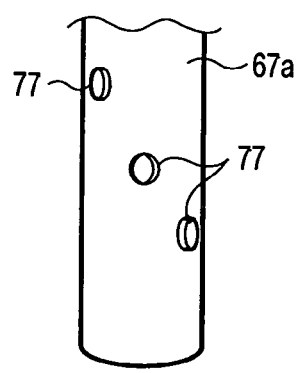

By the way, in the illustrated embodiment, in the outer peripheral surface of the insertion portion 67a of the rotation restricting element 69, there is disposed the spiral-shaped projecting strip 73 which can be slidably engaged with the spiral-shaped groove 71 formed in the inner peripheral surface of the cylindrical rib 63. However, there may also be disposed a plurality of projecting strips to thereby smooth the sliding operation thereof. Also, as shown in FIG. 7A which is a view of a modification of the projecting strip, it is also possible to dispose a projecting strip 75 which extends in a portion of the cylindrical rib 63 in the peripheral direction thereof; or, as shown in FIG. 7B, there may be discretely disposed a plurality of projections 77 which can be slidably engaged with the spiral-shaped groove 71. In the case of these modifications, frictional resistance within the spiral-shaped groove 71 can be reduced, which makes it possible to rotate the rotation restricting element 69 more smoothly.

Also, the above-mentioned embodiments are described using a magnetic tape cartridge which is used in the external recording apparatus for a computer. However, a magnetic tape cartridge according to the present invention is not limited to a magnetic tape cartridge to be used in the external recording apparatus for a computer but the present invention can also be applied to other cartridges, for example, a magnetic tape cartridge for a video tape.

As has been described heretofore, according to the magnetic tape cartridge of the present invention, since insertion of a pin into a datum hole can position the magnetic tape cartridge at a predetermined position and remove the rotation restriction of a reel by a rotation restricting mechanism at the same time, there is eliminated the need for separate provision of pins respectively used to position the magnetic tape cartridge and remove the rotation restriction of the reel, thereby being able to simplify not only the structure of the magnetic tape cartridge but also the structure of recording and reproducing apparatus. Also, because the datum hole is closed by an engagement releasing element to thereby be able to secure excellent dustproof performance, invasion of dust into a case can be prevented positively.

What is claimed is:

1. A magnetic tape cartridge for a single reel comprising:
a case including a datum hole formed by a cylindrical rib having openings only in upper and lower ends into which a positioning pin is inserted at a predetermined position thereof;
a single reel rotatably supported on the case with a magnetic tape wound thereon and including an engaging gear formed in the outer periphery of a flange thereof;
a rotation restricting mechanism disposed in the case and engaging with the engaging gear of the reel to thereby restrict the rotation of the reel; and,
an engagement releasing element slidably inserted into the datum hole from inside the case and removing the engagement between the rotation restricting mechanism and the engaging gear through the sliding movement thereof within the datum hole,
wherein the positioning pin is disposed on a recording and reproducing apparatus, and is inserted into the datum hole from outside of the case to thereby project the engagement releasing element from the datum hole and to position the magnetic tape cartridge at a predetermined position within the recording and reproducing apparatus, and pushes and slides the engagement releasing element, thereby releasing the rotation restriction of the reel by the rotation restricting mechanism; and
wherein the engagement releasing element closes the datum hole when said engagement releasing element is slidably inserted into the datum hole.

2. A magnetic tape cartridge as set forth in claim 1, wherein the rotation restricting mechanism further comprises an engaging element including a shaft part disposed upright on the bottom surface of the case and rotatably supported on the case, a reel lock piece extended from the shaft part in an outer radial direction and having a leading end engageable with the engaging gear, and an inclined piece extended from the shaft part in another outer radial direction and having an inclined surface inclined with respect to the axial direction thereof, the shaft part, the reel lock piece and inclined piece being formed as an integral body; and wherein
the engagement releasing element has a leading end portion contacted with the inclined piece of the engaging element and a base end portion inserted into the datum hole; and,
wherein the magnetic tape cartridge further comprises:
an elastic member for energizing the engagement releasing element in a direction to push the engagement releasing element into the datum hole,
wherein the positioning pin is inserted into the datum hole to thereby project the engagement releasing element from the datum hole, and the leading end portion of the engagement releasing element is pressed against the inclined piece of the engaging element to thereby rotate the engaging element by a predetermined angle, whereby the reel lock piece engaged with the engaging gear is removed from the engaging gear.

3. A magnetic tape cartridge for a single reel comprising:
a case including a datum hole formed by a cylindrical rib having openings only in upper and lower ends into which a positioning pin is inserted at a predetermined position thereof;
a single reel rotatably supported on the case with a magnetic tape wound thereon and including an engaging gear formed in the outer periphery of a flange thereof;
a rotation restricting mechanism disposed in the case and engaging with the engaging gear of the reel to thereby restrict the rotation of the reel; and,
an engagement releasing element slidably inserted into the datum hole from inside the case and removing the engagement between the rotation restricting mechanism and the engaging gear through the sliding movement thereof within the datum hole,
wherein the positioning pin is inserted into the datum hole from outside of the case and pushes and slides the engagement releasing element, thereby releasing the rotation restriction of the reel by the rotation restricting mechanism; and
wherein the engagement releasing element closes the datum hole when said engagement releasing element is slidably inserted into the datum hole; and,
wherein the rotation restricting mechanism further comprises an engaging element including a shaft part disposed upright on the bottom surface of the case and rotatably supported on the case, a reel lock piece extended from the shaft part in an outer radial direction and having a leading end engageable with the engaging gear, and an inclined piece extended from the shaft part in another outer radial direction and having an inclined surface inclined with respect to the axial direction thereof, the shaft part, the reel lock piece and inclined piece being formed as an integral body; and wherein
the engagement releasing element has a leading end portion contacted with the inclined piece of the engaging element and a base end portion inserted into the datum hole; and,
wherein the magnetic tape cartridge further comprises:
an elastic member for energizing the engagement releasing element in a direction to push the engagement releasing element into the datum hole,
wherein the positioning pin is inserted into the datum hole to thereby project the engagement releasing element from the datum hole, and the leading end portion of the engagement releasing element is pressed against the inclined piece of the engaging element to thereby rotate the engaging element by a predetermined angle, whereby the reel lock piece engaged with the engaging gear is removed from the engaging gear.

* * * * *